(12) United States Patent
Patterson

(10) Patent No.: US 6,234,446 B1
(45) Date of Patent: May 22, 2001

(54) PERSONAL AUDIO/VIDEO ENTERTAINMENT SYSTEM

(76) Inventor: John W. Patterson, 20819 229th Pl., SE., Maple Valley, WA (US) 98038

( * ) Notice: Subject to any disclaimer, the term of this patent is extended or adjusted under 35 U.S.C. 154(b) by 0 days.

(21) Appl. No.: 09/008,164

(22) Filed: Jan. 16, 1998

Related U.S. Application Data

(60) Provisional application No. 60/036,083, filed on Jan. 16, 1997.

(51) Int. Cl.[7] .................................................. A47G 29/00
(52) U.S. Cl. ............................ 248/694; 345/8; 381/385; 224/201
(58) Field of Search ................................. 345/8; 248/694; 361/680, 681; 348/53, 838; 381/385, 71.6, 388, 4, 301; 379/430; 434/55; 351/158, 153, 50; 224/201, 930, 674

(56) References Cited

U.S. PATENT DOCUMENTS

| | | |
|---|---|---|
| D. 375,495 | 11/1996 | MacIness . |
| 2,452,103 | 10/1948 | Conradt et al. . |
| 4,070,553 * | 1/1978 | Hass ...................... 179/157 |
| 4,084,139 * | 4/1978 | Jakobe .................. 325/361 |
| 4,440,443 | 4/1984 | Nordskog . |
| 4,450,495 * | 5/1984 | Naruki .................. 360/137 |
| 4,630,821 | 12/1986 | Greenwald . |
| 4,797,934 | 1/1989 | Hufnagel . |
| 4,897,714 | 1/1990 | Ichise et al. . |
| 4,952,024 * | 8/1990 | Gale ...................... 350/143 |
| 4,977,600 | 12/1990 | Ziegler . |
| 5,003,300 * | 3/1991 | Wells .................... 340/705 |
| 5,129,716 | 7/1992 | Holakovsky et al. . |
| 5,212,734 * | 5/1993 | Tsao ...................... 381/188 |
| 5,276,471 | 1/1994 | Yamauchi et al. . |
| 5,371,556 | 12/1994 | Suwa et al. . |
| 5,414,544 | 5/1995 | Aoyagi et al. . |
| 5,467,205 | 11/1995 | Kuba et al. . |
| 5,469,185 | 11/1995 | Lebby et al. . |
| 5,533,137 | 7/1996 | Holmes . |
| 5,543,816 | 8/1996 | Heacock . |
| 5,701,356 * | 12/1997 | Standford et al. ...... 381/187 |
| 5,774,338 * | 6/1998 | Wessling, III .......... 361/730 |
| 5,815,126 * | 9/1998 | Fan et al. ................ 345/8 |
| 6,062,337 * | 5/2000 | Zinserling ............... 181/129 |

* cited by examiner

Primary Examiner—Ramon O. Ramirez
Assistant Examiner—Kimberly Wood
(74) Attorney, Agent, or Firm—Marger Johnson & McCollom, PC

(57) ABSTRACT

A personal audio/visual device comprising a pair of normally spaced modules having lower contoured surfaces shaped to contact and be supported by the shoulders of a wearer. The two modules are coupled together at a back end thereof by a telescoping or folding structure adapted to allow horizontal adjustment between the modules. Integrated within each module are recessed audio speakers positionable adjacent the ears. In a preferred embodiment, the audio/visual device includes two pairs of submodules, each pair being coupled together by a hinge for pivoting movement within the same plane or scissoring movement in parallel planes. In an unfolded position, the lower submodules of the pairs rests on the shoulders of a wearer while the upper submodules touches the sides of a person's head and against the ears. In a folded position, the submodules are pivoted together and the telescoping or folding structure collapsed to minimize the space necessary to store the device.

21 Claims, 4 Drawing Sheets

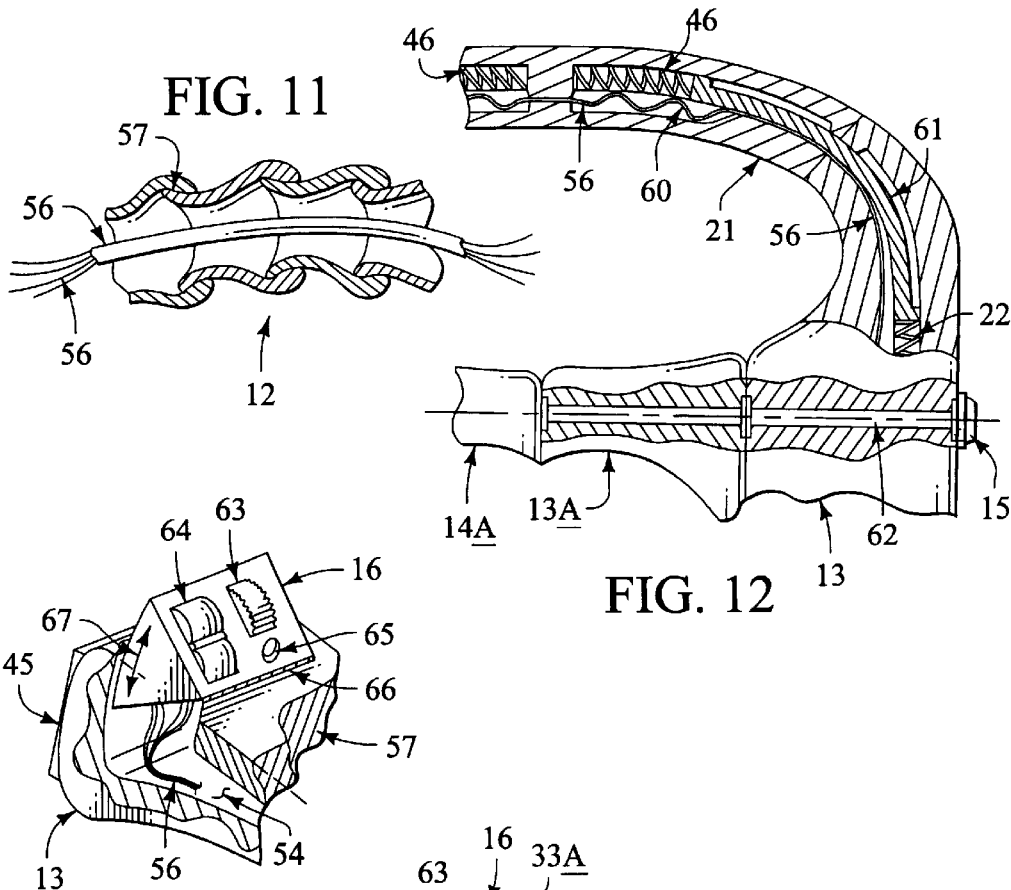
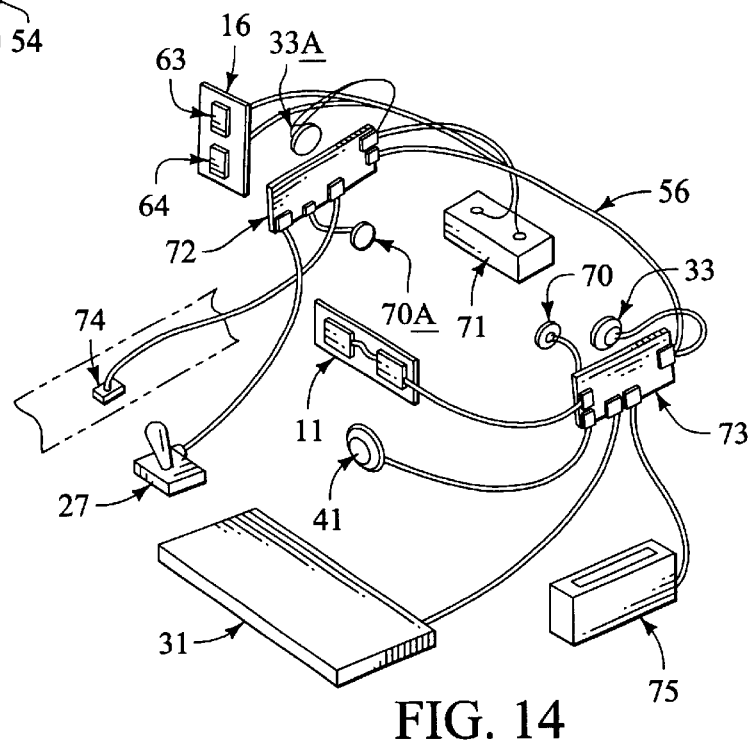

PERSONAL AUDIO/VIDEO ENTERTAINMENT SYSTEM

This application claims benefit to Provisional U.S. Application No. 60/036,083 which was filed Jan. 16, 1997.

BACKGROUND OF THE INVENTION

1. Field of the Invention

This invention relates to audio/video devices and more particularly to such devices that are body or seat mounted and meant for use while the user is in a sitting or reclined position.

2. Description of the Related Art

Presently there is an accelerated evolution in audio/video (A/V) display technology. This rapid advancement, however, is being impeded by numerous obstacles. Such advancements will continue to define the methods we receive, transmit and interact with A/V information.

Body mounted A/V devices are challenged with even greater problems most of which involve the physical proximity of such devices to the human body. Complex physiological and ergonomic problems must be solved before body mounted devices can achieve an advantage over those which are not. Cost also plays a significant role when comparing these two types of devices. A variety of electro-optical technologies are in competition to solve these problems including: LCD (Liquid Crystal Display), LED (Light emitting diode), Laser Scanning and Active Matrix.

Airlines are one of the leading mass transit mediums experimenting with the incorporation of audio/video information systems aboard their vehicles. Some airlines incorporate large projection screens similar to movie theaters. LCD's are also used. On some aircraft LCD's are physically embedded in the rear portion of the seats. This application usually allows a better vantage point and less distractions than viewing the larger screens centrally located on bulkhead partitions.

F.A.A and airline safety regulations are very stringent as to installing A/V devices. Ironically, one of the most nagging dilemmas presently facing use of A/V devices onboard airlines is not safety, but the fact that they cannot achieve "private viewing." Since present viewing devices are not private, airlines have been forced to institute self-censorship in order to eliminate "offensive" subject matter. Airlines see numerous advantages in being able to offer customers onboard entertainment, but they are also acutely aware of their passengers' desire for sensory privacy. In fact, there has been an increase in frivolous law suits filed by airline passengers who claimed they were offended or annoyed by onboard movies which they were unable to ignore.

With the advent of satellite "down linking", airlines will soon be able to offer passengers hundreds of different viewing channels. Future plans expand satellite "down linking" of information with satellite "up linking" in which information may be transmitted as well as received by each and every passenger. Unless private viewing devices can be offered, diversity in onboard A/V entertainment cannot hope to increase. Not just airlines but other forms of mass transit vehicles such as: buses, trains, cruise ships and even automobiles will soon be capable of offering a wide spectrum of onboard A/V entertainment; but they too will be faced with this social dilemma.

The often tedious experience of being confined for long periods of time while traveling is an appropriate arena for A/V entertainment. However, mass transit only exemplifies a growing trend towards sensory privacy common to all public or semi-public environments. A case in point involves a recent referendum put on the ballot in San Jose, Calif. calling for computer work stations to install private booths so as to "protect patrons from exposure to unwanted Internet viewing." Whenever A/V information systems avail themselves to a public or semi-public forum, especially where non-users are unable to avoid visual or audio contact, the same problem will present itself.

Some semi-public environments such as doctor's/dentist's office, hospital, etc. implement even stricter controls on environment which include safety factors. A body mounted A/V device might offer therapeutic value and also be more suited to the constraints of such environments.

"Virtual Reality" (V.R.) has become a buzz word in this new field of A/V technology because it can provide "virtual" involvement between the user and the projected fantasy world it provides. The user's "reality experience" becomes virtually "altered" as well as "deceived."

It is reasonable to say that the application of technology is almost limitless. A/V eyeglasses, which are body mounted, now offer high resolution private viewing. Such technologies project images onto a surface which is only a short distance from the user's eye, while others project the image via low powered laser directly onto the retina itself. The eyes and the brain's visual cortex are tricked into seeing the image appear to exist on a large screen several feet away from the user.

Presently, almost all body mounted A/V devices incorporate head mounted displays or HMDs as they have come to be known. Because of their electromechanical complexity body mounted, HMD's share several common shortcomings. HMD's are cumbersome and their weight makes them uncomfortable to wear, especially for long periods. They require adjustability in several axis to accommodate positioning of the glasses relative to earphones. For this reason they require numerous mechanical joints, structural members and straps. They are excessively heavy (at minimum of 6 ounces) to be supported largely by the forehead and bridge of the nose. Incorporating so many mechanically adjustable parts is one reason why they are also quite expensive. Since the parts must be made as light as possible, they are typically manufactured from plastic and are prone to breaking. Also the mechanical joints are inclined to snag themselves in the user's hair or clothing. Another major drawback of HMDs is the fact that they slip over the head much like a ball cap and thereby inevitably mess up the user's hair. This is especially undesirable when such devices are offered for use in public places where women and men are quite sensitive about their hair looking neat.

There is little rationale for using an HMD while sitting in chairs since most chairs are constructed with backrests which are in close proximity to the user's head. HMDs are heavy and cumbersome and have a tendency to cause headaches, skin irritation and hair loss due to snagging. Because of this, HMD's cannot include additional interface electronics such as A/V drives or television tuning circuits.

Several HMD's are presently available on the retail market. One such device was manufactured by (now defunct) Virtual i.O., Inc. of Seattle, Wash., ref. U.S. Des. Pat. No. 375,495 issued Nov. 12, 1996 to Maciness et al. This device, however, had several important drawbacks. The Virtual i.O. HMD was heavy (more than 6 ounces) and was all encompassing when installed on the head. HMD's, as mentioned above, are not stand alone A/V systems since they all require some form of electronic interface equipment before they can produce a visual image. Though Virtual i.O.'s industrial designers managed to produce a sleek, "space age" exterior design, the device was quite clumsy to put on and ultimately uncomfortable to wear. Once in place, it seemed longer than necessary to adequately adjust the eyeglasses and earphones to the user's particular anatomy. Readjustment was also required whenever the user dramatically changed body position. Within several minutes of use the device tended to cause pain where it rested on the left and right brow area of the temple. This headache, though minor, diminished somewhat after the user's head had become accustom to wearing the device. A lack of outward adjustability of the width of the glasses, however, caused greater degree of discomfort for those with larger craniums. Though the optic resolution of the device was good, it afforded only limited peripheral vision (beyond the screen). This tended to cause a feeling of being trapped by the virtual environment. The device also tended to snag hair.

In general the device incorporated more mechanical parts than would seem necessary. They were flimsy plastic parts and ultimately both earphone pivot joints (plastic) were easily broken. The V.i.O. device was also quite expensive and took several minutes to remove from the box and assemble. This device as well as all other HMD's would be defined only as semi-portable since they require a considerable amount of time to disassemble and store into the box before it can be hand carried. For these reasons, HMD's have never achieved a high degree of commercial success especially for use in a mass transit environment.

A similar headset device U.S. Pat. No. 5,381,183 issued Jul. 2, 1996 to Holmes, appears very similar in design to that of the Maciness device. The inherent claims focus mostly on the earphones and a unique (but complex) manner of adjustment. This device does not represent a stand alone A/V system, but only the glasses and unique earphones to transmit an image from some sort of video transceiver. The Holmes device does not appear to include an over-the-head strap such as the Maciness device. The majority of the weight of this device must then rest upon the bridge of the nose and a small portion on the brow. The patent description claims this device solves the anatomical differences unique to each individual head size by use of highly adjustable, miniature earphones such as those used in WALKMAN?. As would be expected the most difficult challenge to anatomical diversity relates more to adjustability of the glasses (optics) rather than the earphones. This design appears plagued with the same ergonomic shortcomings as those of the Maciness design i.e., too heavy, too physically uncomfortable, too complex in design, easy to damage, poor adjustability, and musses the hair as well as snagging it.

U.S. Pat. No. 5,276,471 issued Jan. 4, 1994 to Yamauchi et al. appears similar in design to previously described devices. This device seems to differ only in how it attempts to address certain anatomical variations. Though this device appears to have a better solution than Maciness and Holmes relative to adjusting for the width of the user's cranium, it too only partially mitigates the tremendous disparity in the anatomy of the human skull since it is designed with limited adjustability on only one axis. Though the mechanisms are designed differently then the Holmes and Maciness device's, this device appears to share the same faults inherent in other mode HMD's.

U.S. Pat. No. 4,273,185 issued to Greenwald, Dec. 23, 1996 describes a device which has specific application onboard commercial aircraft, primarily for the purpose of playing video games. This device does not attach to the human body such as HMD's other than the option to incorporate earphones. Because the intent of this device is to be physically interactive with the user it also employs a joystick. This invention appears to predate the advent of foldout trays which now are inherent to most all airline seats. There are both FAA rules as well as airline rules which would disallow use of this device for both utility and safety reasons. In fact CRT technology is no longer allowed in airline cabin environments.

U.S. Pat. No. 5,297,217 issued to Nguyen Dec. 7, 1993 reflects a evolution over CRT technology. This approach has been popular in recent years because it uses shallow LCD displays rather than CRT's. One of the major drawbacks of this type of device relates the fact that there are literally dozens of airline seat manufacturers in the world and none of their seats are designed the same way. Even if some "generic" package enabled retrofit to the variety of commercial seats that are manufactured, airplane makers as well as airlines seem unwilling to incur the modification costs that would be required. It should be noted that the GEC-Marconi company spent over $100 million dollars trying to develop a system which incorporates seat-embedded LCD displays. This particular system was scheduled to be installed on United Airlines new Boeing 777's. The system was ultimately abandoned for various reasons, but mainly because GEC-Marconi had failed to solve the challenging problems of such a venture. Lack of "private viewing" was not one of reasons this project was dismantled, however it might easily have become an issue had the system endured. Presently Matsushita Avionics is supplying a similar system to the Boeing company, however this system also has many undesirable attributes.

The following U.S. Patents are quite similar to each other in their approach to onboard A/V entertainment devices: U.S. Pat. No. 5,179,447 issued to Lain, Jan. 12, 1993, U.S. Pat. No. 5,374,104 issued to Moore et al., Dec. 20, 1994, U.S. Pat. No. 5,398,991 issued to Smith et al. Mar. 21, 1995 and U.S. Pat. No. 5,316,369 issued to Kanda, May 31, 1994. Each of these patents describes the common feature of a small LCD screen which is integral to the arm rest of airline seats or is modularly attached to a standard arm rest.

Other prior art exists which disclose incorporating audio speakers in headrests. The following patents are referred to in general: U.S. Pat. No. 2,452,103 issued to Conrad et al. on Oct. 26, 1948, U.S. Pat. No. 4,977,600 issued to Ziegler on Dec. 12, 1990 and U.S. Pat. No. 4,797,381 issued to Hufnagel on Jan. 10, 1989. All three of these patents refer to a headrest device which incorporates speakers internal to the device so as to enable the user to enjoy music while using the device. Though these devices look somewhat similar in structure, neither are intended for use with A/V technology nor are they designed to encapsulate any of the electronic components necessary to function as a stand alone A/V transceiver. Therefore, their are no directly comparable characteristics.

Based upon investigation of prior art and exemplified by the aforementioned inventions, it is seen that a need remains for an invention which offers a solution to the numerous and sundry ergonomic and socially provocative shortcomings inherent in present head mounted A/V devices.

SUMMARY OF THE INVENTION

It is therefor an object of the invention to incorporate an A/V display system which enables the user to experience private viewing.

Another object of this invention is to produce an A/V display system which will not be head mounted but rely instead upon distributing its weight onto the muscles of the shoulders and neck which in turn may be supported by the upright backrest of a seat. The device would be shaped similar to a "collar" or "yoke" with right and left modular bodies resting upon the opposing shoulders of the user. These modules are attached behind the user's head by a rigid or semi-rigid interconnecting member. Both right and left modules might, in turn, be separated into two submodules, but in either case the right and left modules or sub-modules are attached via an interconnecting member on opposing sides of the user's head.

A further object of this invention is to provide a device with an external surface and structure that will not be physically discomforting or intrusive to the user's neck or other body parts and in fact might enhance the comfort of the user during usage.

Another object of this device is to incorporate means to adjust the device to fit the shape and contour of a wide variety of anatomical variations.

Another object of this invention is to provide a display device which will be acceptable by F.A.A. and Airline safety standards so the device can be used onboard commercial aircraft.

Another object of this invention is to be non-intrusive or damaging to the surface or structure of any chair, seat or other object to which it might rest or be attached.

A further object of this invention is to have the potential to incorporate numerous electronic features which HMD type devices physically lack the area to incorporate. Such additional electronics might include all circuitry necessary to make a stand alone system without need of any form of input power or input signal data, i.e. A/V disk drive, internal power, video tuning card, decoding devices and interface devices for peripheral keyboard, mouse and joystick.

A further advantage of this invention over HMD's involves the elimination of bare mechanical hinges and joints which tend to snag hair and clothing and are prone to breakage.

This invention could either encase rigid support structures and pivotal joints in a pliable material such as polymeric foam or it may incorporate the use of semi-rigid "closed cell" polymer foam to replace mechanical joints. NOTE: Adjusting the polymer chemistry and varying the viscosity of closed cell foam allows the material to be moldable in such a manner so as to be semi-rigid in one axis yet flexible in other axis.

Except for switches, connectors or other electronic parts which may require accessibility for operation, all other electro/mechanical components may be encased in a supple material such as polymer foam. A static sensitive material may also be used. This will be done so as to protect sensitive parts from damage due to impact, compression or static discharge. The electronics will be removable for the purpose of maintenance once the device is encased and assembled.

Another object of this invention is to have a means to consolidate the device when not in use for purposes of stowing as well as portability. A further object of this invention is to incorporate a handle so as to allow the device to be easy to hand carry.

This invention is designed in particular, but not exclusively, to rest upon the user's shoulders. The center of gravity will be such as to allow it to be worn without the need of a seat backrest.

The invention may also have means to attach itself to the user's shoulders or upper back, either by use of underarm straps or adhesive materials such as velcro for the purpose of ambulatory use.

The device might also have means to attach itself to a seat backrest therefor allowing the user to climb out of his/her seat and leave the device in place. Any such attachment employed for such use would be nonintrusive and avoid damaging the seat's structure or surface.

The invention shall incorporate a rigid or semi-rigid structure which interconnects the two/four modular enclosures residing on opposite sides of the user's head. This structure shall act as a means to adjust the device in a horizontal plane to allow for the head size of the user. Such adjustment may be accomplished in several ways including, but not exclusive to: telescopic sleeves, folding sections or flexible straps which can be adjusted using Velcro. This interconnecting member shall also act as a conduit for electrical wires which interconnect the various electronic devices housed in each module and when in a stow position may also become the carrying handle.

Another integral part of the invention is the optic assembly module. This module may incorporate LCD's or any other electro-optical device which can project visual images into the eye. The optic assembly module is designed so as to be easily positioned by the user for optimum viewing comfort. The assembly may or may not make contact with the user's face, however any such contact would only be incidental and would not rely upon the nose for support. The optic assembly module will be supported by a flexible, segmented, extension support. The segments in this extended support are cylindrical/spherical in shape and interlock in such a manner as a string of beads. Each segment may rotate separately relative to adjoining segments. This relationship allows the optic assembly module to have almost limitless adjustability in all axis. This extension support is also hollow thus acting as a conduit for electrical wires or optic fibers being routed to the optic assembly module. The flexibility of the extension support allows the optic assembly module to be bent inward and stowed in a compartment or cavity in one or more of the modules so as to protect the optic assembly module in its stow or portable position. The external twin modules of the device which house the electronic components will have several input/output and control mechanisms such as powerjacks, signal input connectors, on/off switches and A/V adjustment controls. The device may also incorporate external openings to allow insertion of digital video disks "DVD's" or digital video cassettes "DVC's" into internal drives.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 11 is sectional detail view of the flexible stem used to support the video output means of the device of FIG. 1.

FIG. 12 is a sectional detail of the telescoping coupling means of the device of FIG. 1.

FIG. 13 is a perspective, sectional view of the control panel of the device of FIG. 1.

FIG. 14 is a schematic view of an embodiment of the audio/visual device, showing all electronic devices incorporated in the device as well as peripheral devices which may interface with the device in accordance with the present invention.

DETAILED DESCRIPTION

Figure 1:
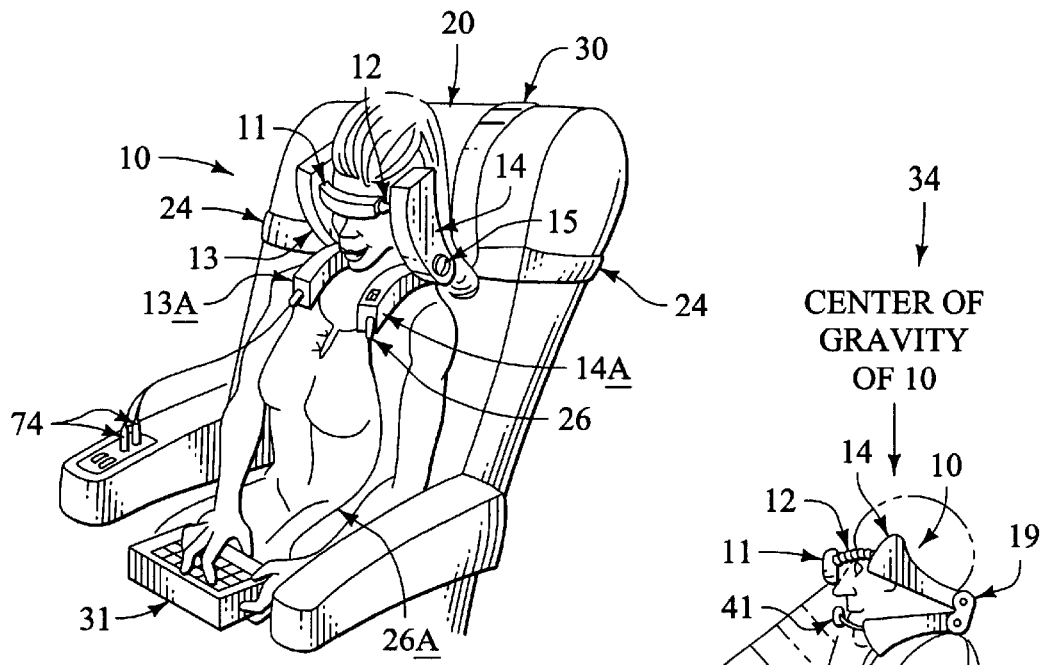
FIG. 1 is a perspective view of a preferred embodiment of an audio/video headrest device constructed in accordance with the present invention mounted in an operative position on a user seated in a reclining position in a seat with a backrest in which a keyboard may act as a peripheral to the device in accordance with the present invention.

Indicated generally at 10 in FIG. 1 is an embodiment of an audio/video, headrest device constructed in accordance with the invention. Prior to describing the detailed structure of the invention, the key components will be identified followed by a brief description of the mechanical operation of these components. Then a more detailed description of each of the component parts will be provided. The combination of internal and external electronic components and their location within the device is non-critical and may vary according to the specific environment in which the device is used.

A "yoke" or "collar" shaped structure balances the weight of sidemounted modules onto the shoulders and neck of the user. FIG. 1 indicates a style which incorporates two "right hand" modules 13 and 13A and two "left hand" modules 14 and 14A interconnected by a horizontal support assembly 9 (FIG. 4) forming the means for adjustably spacing the two modules. A video assembly module 11 is attached via a flexible extension arm 12 to the inside surface of the inclining, left hand module. The left, tension knob 15 and the right tension knob (not shown) allow for a "scissors-like" adjustment of the position of both upper and lower modules on a vertical plane. In FIG. 1 the outside surface of the reclining, lower, right module 13A is coplanar to the inside surface of the inclining, right module 13. The outside surface of the reclining, lower, left module 14A is co-planar to the inside surface of the inclining, left module 14. The location of the instruments/instrument panel 16 (FIG. 4) is shown located on the upper surface of the reclined module 14A (or optionally 13A) in a manner so as to be visible to the user. Additional instruments may be located on the upper surface of 13A or elsewhere. The reclining modules 13A and 14A incorporate a concave, bottom surface 17 and 17A (FIG. 7) so as to conform to the downward slant of the user's neck onto the shoulders. When the modules are folded into consolidated package these concave indentations allow a position for safely storing the optic assembly module (see, e.g. FIG. 8).

FIG. 1 also shows an external cable interface 26A engaged using connector plug 26 into the external surface of module 14A. The opposing end of this interface cable plugs into a keyboard 31. Similar interface cables may also interface other peripheral devices such as a mouse, joystick, etc. A power/signal input cable 74 is shown attached into sockets in the arm of the seat (airplane type). Such input may or may not be required depending on the internal components available within the invention.

Figure 2:
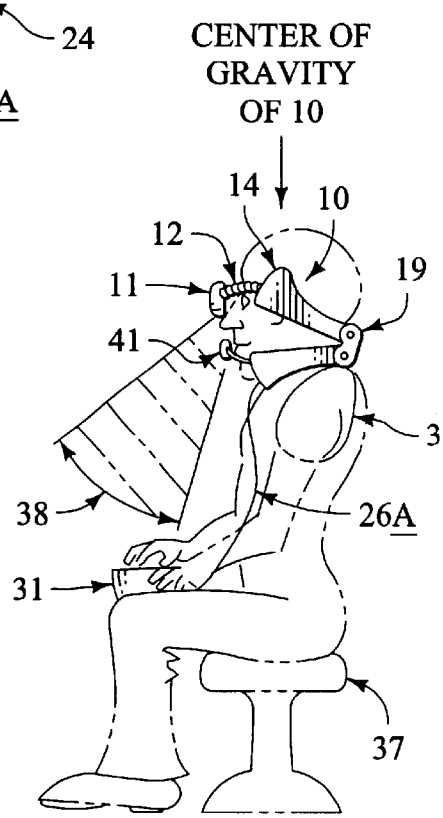
FIG. 2 is a left side perspective view of an alternate embodiment of an audio/video headrest device constructed in accordance with the present invention mounted in an operative position on a user seated in an upright position in a seat without a backrest in which a keyboard may act as a peripheral to the device in accordance with the present invention.

FIG. 2 shows the invention as it might be worn by the user while seated on a stool 37 when there is no available seat backrest for positional support of the device. It should be pointed out that the center-of-gravity (C.G.) of the invention 34 is slightly forward of the C.G. of the user's torso. This enables the device to balance itself on the users shoulders, even without the assistance of a backrest. This is accomplished by the upward force of the horizontal support member 9 (FIG. 4) against the neck where it joins the curve of the skull. A shoulder strap 35 may also be incorporated for additional support. These two factors demonstrate that the device can be functional while the user is standing or even during ambulatory movement.

The area shown by 38 defines a wide field of downward peripheral view enabling the user to user to see and manipulate a keyboard, eat or even read. By tilting the head slightly downward the user's viewpoint would encompass the upper surfaces of the reclining modules 13A and/or 14A where the instrument panel/panels 16 (FIG. 4) are located. The user also has an unobstructed peripheral view beyond the optic assembly module on a horizontal plane on both sides of his head. This viewing area is important for several reasons: it allows the user to be aware of activities outside the viewing screen as well as alleviating a potential sense of claustrophobia or being trapped in a virtual world (which is a complaint made often about HMD devices).

Figure 4:
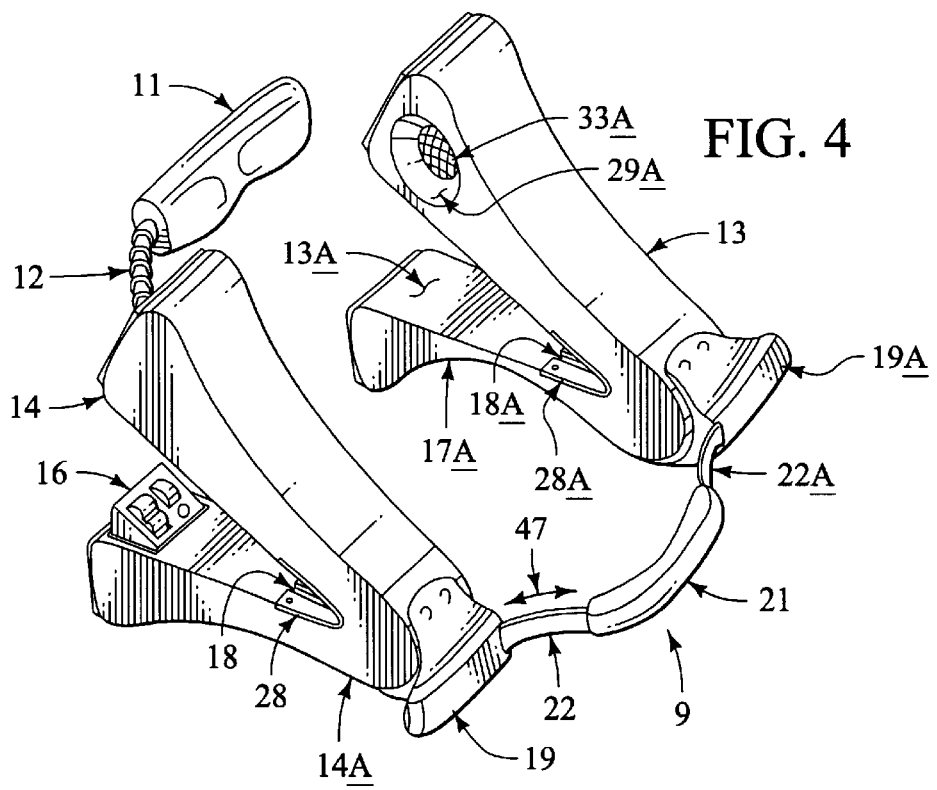
FIG. 4 is a perspective view of a further alternate embodiment of the audio/video headrest device.

In FIG. 2 a hinged, pivoting mechanism 19 attaches the left, upper and lower modules to the horizontal support mechanism 9 (FIG. 4). An identical hinged mechanism 19A is located on the opposite side of the head. These pivoting mechanisms allow vertical, rotational separation of both pairs of modules.

Figure 3:
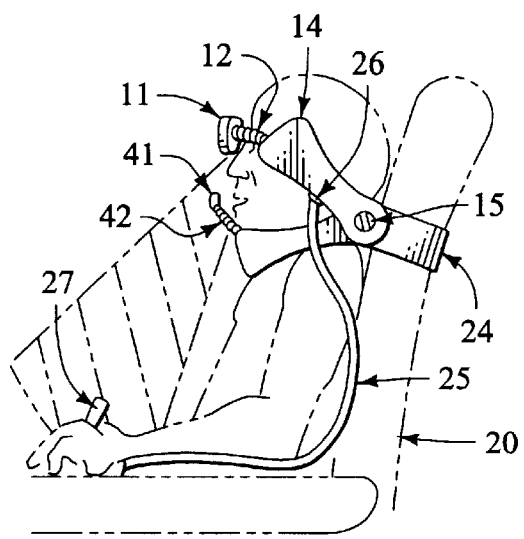
FIG. 3 is a left side view of the device of FIG. 1 mounted in an operative position on a user seated in a reclining position in a seat with a backrest in which a joystick may act as a peripheral to the device in accordance with the present invention.

FIG. 3, like FIG. 2, shows a left side view, however the movement of the left pair of modules 14 and 14A function relative to each other in a "scissors-like" manner as shown in FIG. 1. The method of attachment between the right modules 13 and 13A and left modules 14 and 14A to each end of the horizontal support mechanism 9 which joins them can be achieved by numerous methods which are discussed in greater detail further below.

The horizontal support member may be attached to the seat via Velcro (not shown) and/or elastic seat straps 24 and 30. By so doing, the user is able to rotate the visual assembly module 11 and the microphone 41 away from his face and climb from his seat leaving the device suspended in place. FIG. 3 also demonstrates how wide the peripheral field of view allows the user to operate a mouse or joystick 27 located on a nearby horizontal surface such as a chair arm or table. In this case the interface cable is shown exiting the bottom surface of the left, inclined modules 14.

FIG. 4 shows a rear, perspective view of a model of the device in which the center structure of the horizontal support member 9 includes a handle 21, linked together on one side by the left, horizontal adjustment member 22 and on the right by the right, horizontal adjustment member 22A. In this design both 22 and 22A may be constructed of a rigid or semi-rigid material. In the preferred embodiment, however, the horizontal support member includes a contoured, pliable inner surface adapted to comfortably contact and support a user's neck when worn. These members include a hollow pass-through to encase the electrical wires 56 required to interconnect the electronic components residing in both right and left module pairs. The left, horizontal adjustment member 22 inserts into the left, hinged pivoting mechanism 19, while the right, horizontal adjustment member 22A inserts into the right, hinged, pivoting mechanism 19A.

FIG. 4 also shows a rotating instrument panel assembly 16 located on the top surface of 14A. By rotating the instrument panel assembly into an upwards positions (as shown) the panel is more easily observable by the user. Before consolidating the device, the instrument panel assembly is then rotated downward so that the switches, etc. move below the co-planar, mating surfaces of 14 and 14A.

FIG. 4 also demonstrates the "jaw-like" sub-modular design as shown in FIG. 2. The inherent force required to open the jaws is accomplished by semi-flexible spring joints 28 and 28A. A strip of Velcro 18 is placed between both pairs of jaws so as to counter this upward force and allow adjustment to a specific angle of opening. A semi-rigid spring structure might also be incorporated.

FIG. 4 also shows the approximate position of the right earphone (not shown) and the left earphone 33A. These earphones are recessed into respective right cavity (not shown) and left cavity 29A which are elongated (shown best in FIG. 6) so as to allow for variations in the position of the user's ears. Recession of the earphones also acts as a directional buffer for sound waves, absorbing errant waves that could be heard by someone else other than the user.

Figure 5:
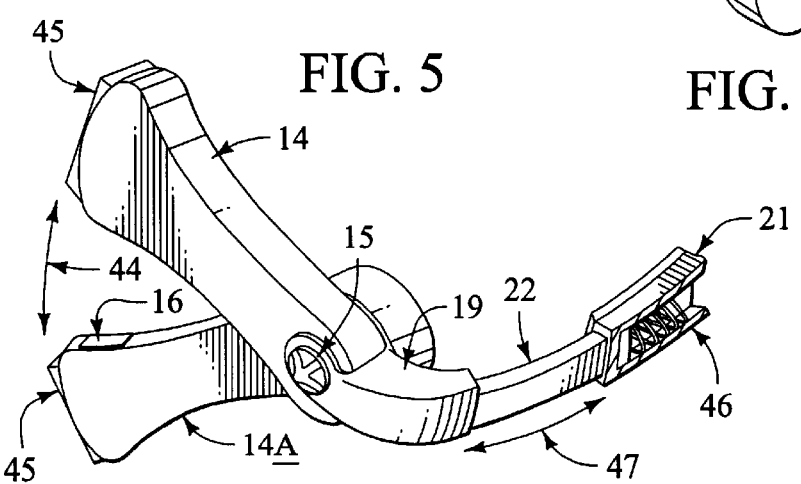
FIG. 5 is a perspective, partial sectional view of the device of FIG. 1.

FIG. 5 depicts a partial left view of the device style constructed similar to FIG. 1 in which the jaws of the upper module 14 and lower module 14A come together in a "scissors-like" manner. In this case, the tension adjustment screw 15 acts as a means for adjusting the vertical gap 44 between modules 14 and 14A. Adjustment member 22 slides into both the handle 21 and the left hinge mechanism 19. An outward force may be accomplished by springs 46 located in 21 or both 19 and 21 (see FIG. 7). FIG. 5 shows rigid or semi rigid end covers 45 which allow the device to have a flat base so as to sit upright when it is in a consolidated position.

Figure 6:
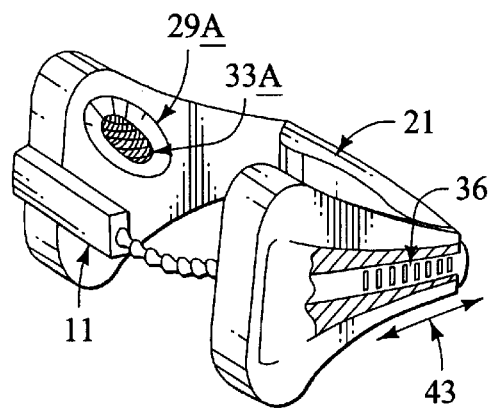
FIG. 6 is a perspective view of yet another alternate embodiment of the device of FIGS. 1, 2 and 4.

FIG. 6 depicts a front, left, perspective view of a version of the A/V headrest assembly consisting of single left and right modules 76 and 76A. Adjustment of the width of the horizontal support member can be accomplished by similar means as the "four module" designs or may incorporate a horizontal movement 43 of a slide track 36 along the outside surfaces of both modules via a semi-rigid structure. It should be reiterated that the A/V head rest assembly is not restricted in construction, to any particular mechanism; but may incorporate various combinations of adjustment mechanisms.

Figure 7:
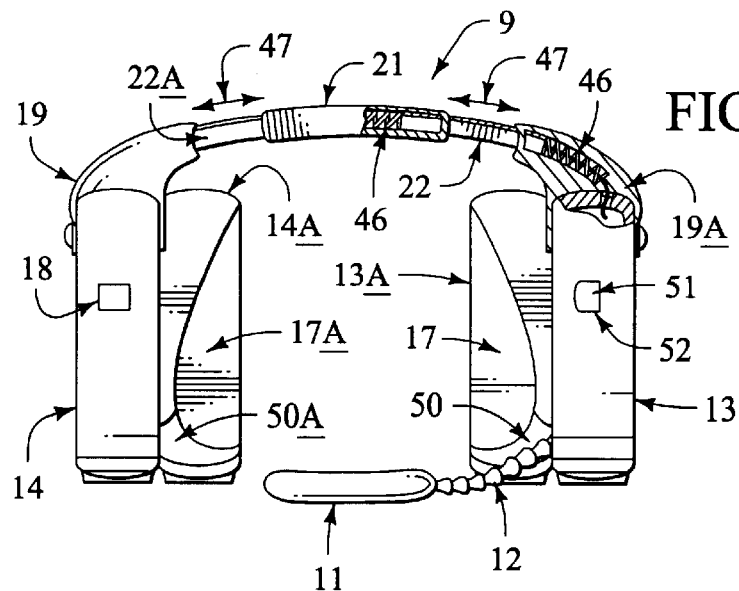
FIG. 7 is a bottom (and partially sectioned) plan view of the device of FIG. 1 in an operative position.

FIG. 7 is a bottom view of the device as shown in FIG. 1. This view more clearly defines the shape, structure and function of the rear horizontal support mechanism 9 as well as cavities 17 and 17A and cavities 50 and 50A. Cavities 17 and 17A are incorporated so as to become a compartment for storing both the optical assembly module 11 as well as the microphone 41 (FIG. 12). It should be noted that the component part 41 (not shown in this view) is an optional add-on device to the system and may be attached to either 13A or 14A. FIG. 7 demonstrates more clearly the telescopic adjustment mechanisms related to 21, 22, 22A, 19 and 19A.

The activating force mechanism which tends to force these subcomponents outwardly are springs 46 integral to both 21 and 19, 19A. This adjustment would also require a tension adjustment of some type to enable support 9 to stay in a pre-adjusted span. FIG. 7 also illustrates the consolidating strap 51 which, when extended out of the strap slot 52 and attached to the Velcro strip 18, it enables all four modules to be held together in the stow position. The consolidating strap 51 also holds the optical assembly module 11 and microphone 41 inside cavities 17 and 17A when in the consolidated position.

Figure 8:
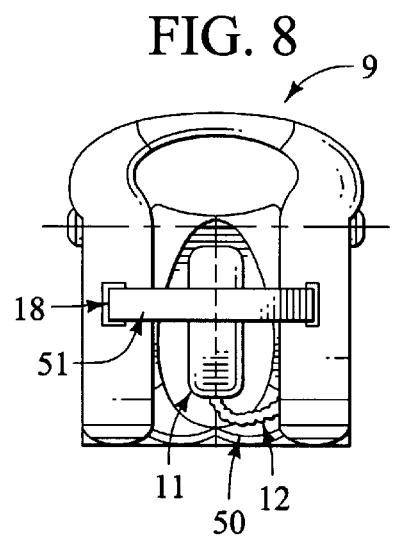
FIG. 8 is a bottom plan view of the device of FIG. 7 is a folded or collapsed position.

FIG. 8 is a bottom view of the device 10 in the consolidated position. The horizontal support mechanism 9 is now compressed and acts as a handle for hand carrying. The consolidating strap has been extended across all four modules and attached to the Velcro strip 18 located on the bottom surface of module 13. The optical assembly module 11 and the microphone 41 (not shown) are held safely inside the combined cavities of 17 and 17A, while cavity 50 becomes a storing area for the optical extension arm 12.

Figure 9:
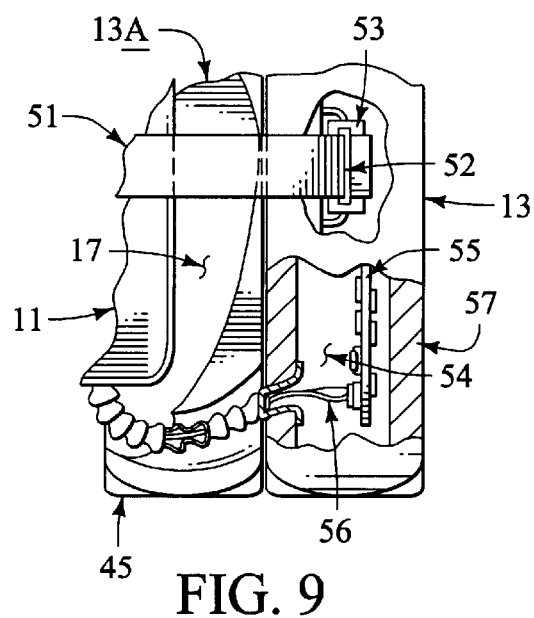
FIG. 9 is a partial sectioned view of the device of FIG. 8.

FIG. 9 is a bottom sectional detail of modules 14 and 14A. Showing the strap retracting device 53, the consolidating strap 51 and the strap slot 52. The internal portion of module 14 as well as the other modules incorporates cavities 54 for locating electronic or mechanical component parts, including printed wiring board 55, cables and wiring 56, etc. The wall of the modules is constructed from a light weight, supple material such as closed cell, polymer foam 57 but may also be constructed using a thin-walled, injection molded plastic shell.

Figure 10:
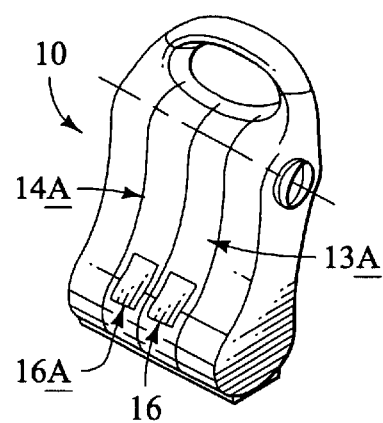
FIG. 10 is a top perspective view of the device of FIG. 8 in a stowed, folded position.

FIG. 10 shows a perspective top view of the device 10 in a consolidated package. On the top surfaces of modules 13A and 14A the instrument panels 16 and 16A are visible in their closed (unused) position.

FIG. 11 is a sectional detail of the optical assembly support member 12 which is comprised of hollow, interlocking, plastic members 57. Each member can be disconnected from an adjacent member using a special tool. Each member can pivot or rotate on all axis relative to each other member. The inside of the hollow support member allows it to act as a conduit for optical wires 56 going to and from the optical assembly module.

FIG. 12 is a front, sectional, detail of a possible mechanical method that would allow telescopic expansion of the horizontal support member 9. In this design, springs 46 force adjustment members 22 and 22A (not numbered) to slide horizontally outward within channel 61. Tension built into the walls of 61, or by other means, produce a resistance to this outward movement and allow effortless, horizontal adjustment by the user. The wires 56 which connect both sets of modules are permanently attached to both adjustment means 22 and 22A. But service loops 60 are required to account for this outward movement of interconnecting members. Modules 13 and 13A are attached via a shaft 62 which incorporates a screw on tension knob 15 to hold the modules in proper relationship to each other.

FIG. 13 is a rear, left sectional view of the instrument control panel 16 which is mounted on the top surface of the module 13 and in this case is comprised of a tuning knob 63, and on/off switch 64 and a power-on light 65. The device 16 is designed so as to pivot into an upward position 67 by a hinge 66 while in use making the instruments easier for the user to see. When the device is consolidated, the rotating panel descends into the module so that all instruments are below the top surface of the module 9. A cover (not shown) may also be incorporated to protect the instruments during storage or portability. There may also be a similar type of instrument control panel on the opposing lower module 13A. The walls of module 57 are preferably constructed of closed cell polymer foam or thin walled plastic. Internal cavities 54 will exist within each of the four modules 13, 13A and 14, 14A to allow routing of wires 56 and to house electro/mechanical component parts.

FIG. 14 is a schematic/block diagram showing the possible electronic component parts either incorporated within the device or existing as peripheral component parts. The audio/video system may incorporate or interface with any combination of these devices or all of these devices. The devices include the video assembly module 11, the video driver printed circuit card 73, and audio/video cassette drive such as a DVD or DVC drive 75, an A/V tuning printed circuit card 72, earphones 33 and 33A, the module interface cable assembly 56, instrument control panel 16, microphone 41, head movement sensors 70 and 70A, a battery 69, an external power/signal interface cable 74, a mouse or joystick 27 and a keyboard 31.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustably spacing said first module from said second module;
   audio output means defined in said first and second modules;
   video output means;
   an upper submodule;
   a lower submodule hingedly attached to said upper submodule adjacent a back end thereof for scissor-like pivoting movement in a plane parallel to said upper submodule; and
   means for fixing said upper submodule and said lower submodule at a desired angle relative to one another in an operative, unfolded position.

2. The device of claim 1 wherein said lower submodule includes an outer surface that is coplanar with an inner surface of said upper submodule.

3. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustably spacing said first module from said second module;
   audio output means defined in said first and second modules;
   video output means; and
   means for extending said first and second modules forwardly.

4. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustably spacing said first module from said second module;
   audio output means defined in said first and second modules; and
   video output means,
   wherein the audio output means includes an elongate cavity disposed on inner surfaces of each of said first and second modules and an earphone recessed within each cavity.

5. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustably spacing said first module from said second module;
   audio output means defined in said first and second modules;
   video output means wherein the means for adjustably spacing the first module from the second module includes:
      an elongate handle having an axial bore defined therethrough;
      a first horizontal adjustment member having one end slidably received in said axial bore and another end linked to the first module; and
      a second horizontal adjustment member having one end slidably received in said axial bore and another end linked to said second module, said first and second modules being adjustably spaced by varying the amount of the first and second horizontal adjustment members received in the axial bore of the elongate handle.

6. The device of claim 5, wherein said first and second modules each comprise:
   an upper submodule;
   a lower submodule hingedly attached to said upper submodule adjacent a back end thereof for coplanar rotating movement relative to said upper submodule; and
   means for adjustably disposing said upper submodule and said lower submodule at a desired angle relative to one another in an operative, unfolded position.

7. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustable spacing said first module from said second module;
   audio output means defined in said first and second modules; and
   video output means,
   wherein the first and second modules include coplanar surfaces defined on a front end thereof so that the device can rest upright on a flat surface while in a closed, folded position.

8. A personal audio/visual device comprising:
   a first module having a lower contoured surface shaped to contact and be supported by the shoulders of a wearer;
   a second module having a lower contoured surface shaped to contact and be supported by the shoulders of a wearer;
   means for adjustably spacing said first module from said second module;

audio output means defined in said first and second modules; and video output means, and retaining means passing from the first module to the second module for retaining the device in a closed, folded position.

9. A personal audio/visual device comprising:

a first module having a lower contoured surface shaped to contact and be supported by the shoulders of a wearer;

a second module having a lower contoured surface shaped to contact and be supported by the shoulders of a wearer;

means for adjustably spacing said first module from said second module;

audio output means defined in said first and second modules; and video output means, and means for substantially supporting said device to an upper portion of a seat backrest.

10. A personal audio/visual device comprising:

a first module comprising a first pair of submodules hingedly attached adjacent a back end thereof for pivoting movement in the same plane relative to one another from a closed position to an open position, one submodule of which having a lower contoured surface shaped to contact and be supported by a shoulder of a wearer;

a second module comprising a second pair of submodules hingedly attached adjacent a back end thereof for pivoting movement in the same plane relative to one another from a first closed position to a second open position, one submodule of which having a lower contoured surface shaped to contact and be supported by a shoulder of a wearer;

means coupled between the back end of the first module and the second module for adjustably spacing the first module from the second module;

the first and second submodule pairs each including an upper submodule having an audio output means defined on an inner surface and positionable adjacent a wearer's ears when the submodule pairs are pivoted to the second open position, wherein the audio output means includes an elongate cavity disposed on inner surfaces of each of said first and second modules and an earphone recessed within each cavity; and video output means coupled to one of said modules via a flexible stem.

11. The device of claim 10, wherein the means for adjustably spacing the first module from the second module includes:

an elongate handle having an axial bore defined therethrough;

a first horizontal adjustment member having one end slidably received in said axial bore and another end linked to the first module;

a second horizontal adjustment member having one end slidably received in said axial bore and another end linked to said second module, said first and second modules being adjustably spaced by varying the amount of the first and second horizontal adjustment members received in the axial bore of the elongate handle.

12. The device of claim 10, wherein the first and second modules include coplanar surfaces defined on a front end thereof so that the device can rest upright on a flat surface.

13. A personal audio/visual device comprising:

a first module comprising a first pair of submodules hingedly attached adjacent a back end thereof for pivoting movement in parallel to one another from a closed position to an open position, one submodule of which having a lower contoured surface shaped to contact and be supported by a shoulder of a wearer;

a second module comprising a second pair of submodules hingedly attached adjacent a back end thereof for pivoting movement in parallel planes relative to one another from a first closed position to a second open position, one submodule of which having a lower contoured surface shaped to contact and be supported by a shoulder of a wearer;

means coupled between the back end of the first module and the second module for adjustably spacing the first module from the second module;

the first and second submodule pairs each including an upper submodule having an audio output means defined on an inner surface and positionable adjacent a wearer's ears when the submodule pairs are pivoted to the second open position; and video output means coupled to one of said modules via a flexible stem.

14. The device of claim 13, wherein said lower submodule includes an outer surface that is coplanar with an inner surface of said upper submodule.

15. The device of claim 13, wherein the audio output means includes an elongate cavity disposed on inner surfaces of each of said first and second modules and an earphone recessed within each cavity.

16. The device of claim 13, wherein the means for adjustably spacing the first module from the second module includes:

an elongate handle having an axial bore defined therethrough;

a first horizontal adjustment member having one end slidably received in said axial bore and another end linked to the first module;

a second horizontal adjustment member having one end slidably received in said axial bore and another end linked to said second module, said first and second modules being adjustably spaced by varying the amount of the first and second horizontal adjustment members received in the axial bore of the elongate handle.

17. The device of claim 13, wherein the first and second modules include coplanar surfaces defined on a front end thereof so that the device can rest upright on a flat surface while in a closed, folded position.

18. The device of claim 13, further including retaining means passing from the first module to the second module for retaining the device in a closed, folded position.

19. The device of claim 13, further including means for substantially supporting said device to an upper portion of a seat backrest.

20. The device of claim 13, wherein the means for adjustably spacing includes a contoured pliable inner surface adapted to contact and support rear of a user's neck when worn.

21. The device of claim 13, further including means within said means for adjustably spacing for electrically coupling said first module with said second module.

* * * * *

UNITED STATES PATENT AND TRADEMARK OFFICE
CERTIFICATE OF CORRECTION

PATENT NO.    : 6,234,446 B1                                                     Page 1 of 1
DATED         : May 22, 2001
INVENTOR(S)   : John W. Patterson It is certified that error appears in the above-identified patent and that said Letters Patent is hereby corrected as shown below:

Title page,
Item [56], References Cited, insert:

--       FOREIGN PATENT DOCUMENTS
GB009732     02/03/02     05/10/01     Barrett --

Column 1,
Lines 4-5, "This application claims benefit to" should be -- This application is a continuation-in-part of --.

Column 2,
Line 32, "electromechanical" should be -- electro-mechanical --.

Column 3,
Line 30, "U.S. Pat. No. 5,381,183" should be -- U.S. Pat. No. 5,533,137 --.
Line 63, "U.S. Pat. No. 4,273,185" should be -- U.S. Pat. No. 4,630,821 --.

Column 4,
Line 9, "U.S. Pat. No. 5,297,217" should be -- U.S. Pat. No. 5,267,775 --.
Line 46, "U.S. Pat. No. 4,797,381" should be -- U.S. Pat. No. 4,797,934 --.

Signed and Sealed this

Twenty-fifth Day of February, 2003

JAMES E. ROGAN
*Director of the United States Patent and Trademark Office*